United States Patent
Yaeli

[11] Patent Number: 5,098,575
[45] Date of Patent: Mar. 24, 1992

[54] METHOD AND APPARATUS FOR PROCESSING LIQUID SOLUTIONS OF SUSPENSIONS PARTICULARLY USEFUL IN THE DESALINATION OF SALINE WATER

[76] Inventor: Joseph Yaeli, 8 Rachel St., 34401 Haifa, Israel

[21] Appl. No.: 647,087

[22] Filed: Jan. 29, 1991

[30] Foreign Application Priority Data

Jul. 13, 1990 [IL] Israel .......................................... 95075

[51] Int. Cl.$^5$ ............................................ B01D 61/00
[52] U.S. Cl. ................................. 210/652; 210/177; 210/195.2; 210/295
[58] Field of Search ............... 210/652, 650, 651, 653, 210/195.2, 321.72, 295, 296, 177

[56] References Cited

U.S. PATENT DOCUMENTS

| | | | |
|---|---|---|---|
| Re. 32,144 | 5/1986 | Keefer | 210/652 |
| 3,206,397 | 9/1962 | Harvey | 210/652 |
| 3,702,820 | 3/1970 | Hough | 210/637 |
| 3,906,250 | 9/1975 | Loeb | 210/652 |
| 4,156,645 | 5/1979 | Bray | 210/652 |

FOREIGN PATENT DOCUMENTS 1217054 12/1970 European Pat. Off. ............ 210/652

0098199 6/1983 Japan .................................. 210/652

OTHER PUBLICATIONS

R. G. Rosehart, "Mine Water Purification by Reverse Osmosis", The Canadian Journal of Chemical Engineering, vol. 51, (12, 1973), No. 6.

Primary Examiner—Robert A. Dawson
Assistant Examiner—Ana Fortuna
Attorney, Agent, or Firm—Benjamin J. Barish

[57] ABSTRACT

A method and apparatus for reducing the concentration of a first substance in a first liquid by: (a) subjecting the first liquid to natural osmosis, via a first semipermeable body, with respect to an intermediate liquid, which intermediate liquid is a solution or suspension of a second substance in a second liquid, the second liquid being the same as the first liquid and passing through the first semipermeable body, the second substance being of larger molecular size than the first substance and not passing through the first semipermeable body, whereby the quantity of the second liquid in the intermediate liquid is increased; and then (b) subjecting the intermediate liquid to reverse osmosis under pressure via a second semipermeable body to pass therethrough the second liquid.

15 Claims, 1 Drawing Sheet

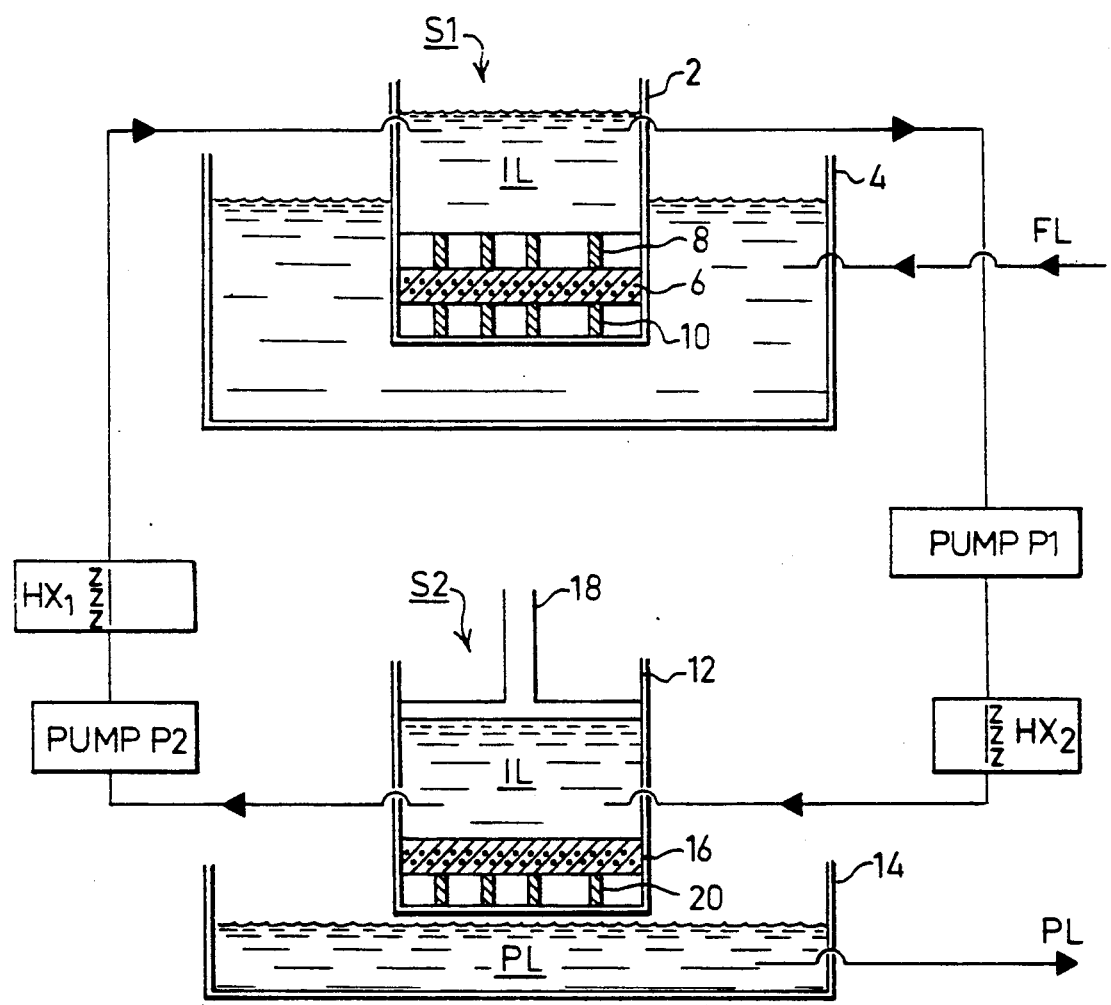

METHOD AND APPARATUS FOR PROCESSING LIQUID SOLUTIONS OF SUSPENSIONS PARTICULARLY USEFUL IN THE DESALINATION OF SALINE WATER

FIELD AND BACKGROUND OF THE INVENTION

The present invention relates to a method and apparatus for processing liquid solutions or suspensions in order to reduce the concentration of a substance dissolved and/or suspended therein. The invention could be used in many diverse industrial processes, e.g., for purifying waste solutions, or for extracting specific solutes from solutions or suspensions. The invention, however, is particularly useful in the desalination of saline water, and is therefore described below with respect to such application.

The invention is particularly applicable to industrial processes utilizing a reverse osmosis technique. In the reverse osmosis process, mechanical pressure is applied to the feed liquid on one side of a semipermeable body, such as semipermeable membrane, to force the solvent (e.g., water) through the pores of the semipermeable body while the solute is rejected because of its inability to pass through such pores. Many such semipermeable membranes have been designed for use in reverse osmosis processing, but all are characterized by having small pores in order to pass water molecules while rejecting the salt molecules. Such membranes therefore exhibit very large resistance to the flow of the water molecules through the membrane, and accordingly require extremely high pressures to be used, up to about 70 atmospheres. Further, the resulting throughput of pure water is limited even when large mechanical pressures are applied. Still further, since the pores of the semipermeable membranes must be of relatively small size they are easily clogged, thereby seriously limiting the useful life of such membranes before cleaning or replacement is required. All the foregoing drawbacks of the existing reverse osmosis techniques substantially increase the cost of using reverse osmosis particularly in the desalination of saline water.

OBJECTS AND BRIEF SUMMARY OF THE INVENTION

An object of the present invention is to provide a method, and also an apparatus, for processing a feed liquid, and particularly for desalinating saline water, having advantages in the above respects.

According to the present invention, there is provided a method of processing a feed liquid in the form of a solution or suspension of a first substance in a first liquid in order to reduce the concentration of the first substance in the first liquid, comprising the steps: (a) subjecting the first liquid to natural osmosis, via a first semipermeable body, with respect to an intermediate liquid, which intermediate liquid is a solution or suspension of a second substance in a second liquid, the second liquid being the same as the first liquid and passing through the first semipermeable body, the second substance being of larger molecular size than the first substance and not passing through the first semipermeable body, whereby the quantity of the second liquid in the intermediate liquid is increased; and then (b) subjecting the intermediate liquid to reverse osmosis under pressure via a second semipermeable body having larger pores than the first semipermeable body to pass therethrough the second liquid but to reject the second substance of larger molecular size.

As indicated earlier, the invention is particularly applicable for desalinating saline water, whereupon the feed liquid would be mechanically filtered sea water; the first semipermeable body would be semipermeable membranes having pores with size such as those presently used in reverse osmosis systems for desalinating water; and the second semipermeable body would have much larger pores so that it is semipermeable with respect to the second substance.

The intermediate liquid used in the process could be selected according to the particular application. A preferred intermediate liquid, particularly in the desalination of saline water, is a concentrated solution of a solute with large sized molecules such as cane sugar in water.

It will thus be seen that the above-described process is a two-stage process, namely a first stage involving natural osmosis, and a second stage involving reverse osmosis. The natural osmosis stage has a very low rate of throughput, but since this stage does not require mechanical pressure, very substantial surfaces of the semipermeable membrane may be provided at relatively low cost in order to increase the throughput in this stage. While the reverse osmosis stage does require mechanical pressure, the semipermeable bodies used in this stage must now deal with the larger molecular-size substances present in the intermediate liquid, rather than the relatively smaller molecular-size present in the feed liquid. Therefore semipermeable membranes of larger pore size may be used in this stage, and lower mechanical pressures may be applied, to increase the throughput and/or to reduce the overall cost. Moreover, the larger pores in the second semipermeable body are less sensitive to clogging, thereby substantially increasing the useful life of such bodies before cleaning or replacement is required.

The intermediate liquid used in the first stage, being a concentrated solution, exhibits a higher osmotic pressure than the feed liquid, to produce the natural osmosis flow of water through the first semipermeable body, which flow may continue until the osmotic pressures of the two liquid become substantially equal. In order to increase the osmotic pressure of the intermediate liquid, it may be heated, e.g., by a sun pond, to thereby increase its solubility and the concentration of the solute therein.

In addition, the process may be performed in a cyclic manner, wherein the intermediate liquid, diluted in the first stage and reconcentrated in the second stage, is recirculated back to the first stage while fresh feed water is added in the first stage.

It will thus be seen that the two-stage osmosis process as described above provides a number of important advantages over the previously known one-stage reverse osmosis process. Thus, the two-stage process is capable of yielding larger throughputs with the same mechanical pressure, thereby achieving smaller cost per unit yield. In addition, the membrane costs are substantially reduced since no mechanical pressure is used in the natural osmosis stage; and in the reverse osmosis stage where mechanical pressure is used, the bodies have to deal with larger molecular weight solutes. The foregoing advantages make the process particularly useful for the desalination of sea water having relatively high concentrations of salts, or of saline water having lower concentrations of salts but still not suitable for drinking, agriculture, or industrial purposes.

Further features and advantages of the invention will be apparent from the description below.

BRIEF DESCRIPTION OF THE DRAWINGS

The invention is herein described, by way of example only, with reference to the accompanying single FIGURE of drawings schematically illustrating one setup for processing a feed liquid, particularly for desalinating saline water, in accordance with the present invention.

DESCRIPTION OF A PREFERRED EMBODIMENT

The apparatus illustrated in the drawing comprises two stages, namely stage $S_1$ involving a natural osmosis process, and stage $S_2$ involving a reverse osmosis process. The setup illustrated in the drawing is a continuous one wherein the feed liquid FL is fed into stage $S_1$, and produced liquid PL is outputted from stage $S_2$. In the preferred embodiment described below, the feed solution liquid FL is saline water, and the produced liquid PL is relatively pure water.

Stage $S_1$ comprises an inner vessel 2 for receiving an intermediate liquid IL, and an outer vessel 4 for receiving the saline water FL, or other feed liquid, e.g., a solution or suspension to be processed. Vessel 2 is closed at its lower end by a semipermeable membrane 6, supported on its opposite sides by a supporting structure as shown at 8 and 10.

The reverse-osmosis stage $S_2$ includes another inner vessel 12 receiving the intermediate liquid IL from vessel 2 in stage $S_1$, and an outer vessel 14 for receiving the pure water PL produced in the second stage $S_2$. The lower end of vessel 12 is closed by a second semipermeable membrane 16 through which the pure water passes by reverse osmosis, when subjected to the mechanical pressure produced by a piston 18. The opposite side of body 16 is supported against bursting by a supporting structure 20.

In the setup schematically illustrated in the accompanying drawing, the intermediate liquid is circulated within a closed-loop circulation system, including a pump $P_1$ for pumping the liquid to stage $S_2$ after having been diluted by natural osmosis in stage $S_1$, and a second pump $P_2$ for pumping the liquid back to stage $S_1$, after having been reconcentrated by reverse osmosis in stage $S_2$.

As described above, the intermediate liquid IL is a concentrated solution of a solute having a larger molecular weight than the solute in the feed liquid FL. Thus, where the feed liquid is saline water, the intermediate liquid IL may be a concentrated solution (preferably concentrated to saturation) of a solute, such as cane sugar, in water. Cane sugar is a preferred choice for several reasons: Thus, it has high solubility in water, being about 6 moles per liter, and therefore the osmotic pressure of its saturated solution may be many times that of the feed solution; it is about ten times that of sea water. This pressure difference assures a significant flow of water from the sea water into the sugar solution during the natural osmosis of stage $S_1$. In addition, the large size of the molecules in cane sugar, together with the large area of contact between the two solutions and the membrane in the natural osmosis stage $S_1$ (which is economically permitted because no mechanical pressure is applied in this stage), assures that the flow of pure water from the saline water into the sugar solution will be a quick and efficient process. In addition, the cleaning of the membranes from clogging sugar or sugar products is easily done in boiling water because of the even larger solubility of sugars in high temperatures.

The operation of the system illustrated in the accompanying drawing will be apparent from the above description.

Thus, the saline water FL, or other feed liquid to be purified, is added to vessel 4, while the inner vessel 2 contains the intermediate liquid IL, such as a concentrated sugar solution, having a substantially larger osmotic pressure than the saline water. Accordingly, pure water from the saline water will pass through membrane 6 by natural osmosis to dilute the concentrated solution until its osmotic pressure drops to or close to that of the saline water. Thus, if the intermediate liquid IL has an osmotic pressure of ten times that of the sea water, the volume of the intermediate liquid will be greatly expanded (up to about ten times its initial volume) until its osmotic pressure is reduced almost to that of the sea water, at which time the natural osmosis process substantially ends.

At this time, the diluted intermediate liquid IL is pumped by pump $P_1$ into the interior of vessel 12 in the second stage $S_2$, while mechanical pressure is applied via piston 18 to force, by reverse osmosis, pure water to pass through body 16 into vessel 12, where the pure water is outletted via PL.

Before the dilute intermediate liquid IL is pumped by pump $P_1$ into vessel 12 of stage $S_2$, concentrated solution from vessel 12 in stage $S_2$ is pumped by pump P into vessel 2 of stage $S_1$.

In order to increase the osmotic pressure of the intermediate liquid IL when it is pumped back into vessel 2 of stage $S_1$, it may be heated, as shown schematically by heat-exchanger $HX_1$. This heat may be derived, for example, from a solar pond or other solar collector. When the imtermediate liquid IL is pumped in diluted form from stage $S_1$, to stage $S_2$, its osmotic pressure may be reduced by cooling it in another heat exchanger $HX_2$. The cooling of the intermediate liquid IL is also effected by the relatively cooler saline water FL in stage $S_1$.

While the invention has been described with respect to one preferred embodiment, it will be appreciated that the invention could advantageously be used with other feed liquids and intermediate liquids.

What is claimed is:

1. A method of processing a feed liquid in the form of a solution or suspension of a first substance in a first liquid in order to reduce the concentration of said first substance in said first liquid, comprising the steps:

(a) subjecting the first liquid to natural osmosis, via a first semipermeable body, with respect to an intermediate liquid, which intermediate liquid is a solution or suspension of a second substance in a second liquid, the second liquid being the same as the first liquid and passing through said first semipermeable body, the second substance being a larger molecular size than the first substance and not passing through said first semipermeable body, whereby the quantity of said second liquid in the intermediate liquid is increased; and then (b) subjecting said intermediate liquid to reverse osmosis under pressure via a second semipermeable body having larger pores than said first semipermeable body to pass therethrough said second liquid but to reject said second substance of larger molecular size.

2. The method according to claim 1, wherein said first liquid is a solution or suspension of salt in water.

3. The method according to claim 2, wherein said first and second semipermeable bodies are semipermeable membranes.

4. The method according to claim 1, wherein said intermediate liquid is a concentrated solution of cane sugar in water.

5. The method according to claim 1, wherein the intermediate liquid resulting from step (b) is recirculated to one side of said first semipermeable body in step (a) while fresh feed liquid is added to the other side of the semipermeable body in step (a).

6. The method according to claim 1, wherein the intermediate liquid is heated and its concentration is increased to thereby increase its osmotic pressure before being subjected to natural osmosis in step (a), and is cooled before being subjected to reverse osmosis in step (b).

7. A method of desalinating saline water, comprising the steps:
(a) subjecting the saline water to normal osmosis via a semipermeable body with respect to a concentrated solution of a high-molecular weight substance dissolved in water, to thereby dilute the concentrated solution;
(b) and then subjecting the so-diluted concentrated solution to reverse osmosis under pressure via a second semipermeable body having larger pores than said first semipermeable body to pass water therethrough, and to reject the higher molecular weight substance.

8. The method according to claim 7, wherein the reconcentrated solution produced in step (b) is recirculate to one side of said semipermeable body in step (a) while fresh saline water is added to the other side of the semipermeable body in step (a).

9. Apparatus for processing a feed liquid in the form of a solution or suspension of a first substance in a first liquid in order to reduce the concentration of said first substance in said first liquid, comprising:
a first semipermeable body;
means for feeding the feed liquid to one side of said first semipermeable body;
means for feeding to the other side of said first semipermeable body an intermediate liquid which is a solution or suspension of a second substance in a second liquid to effect natural osmosis of said second liquid through said first semipermeable body, said second liquid being of the same liquid material as said first liquid, the second substance being of larger molecular weight than said first substance;
a second semipermeable body having larger pores than said first semipermeable body;
means for feeding the intermediate liquid from said other side of the first semipermeable body to one side of the second semipermeable body;
and means for applying mechanical pressure to said intermediate liquid on said one side of the second semipermeable body to thereby effect reverse osmosis of the second liquid through said second semipermeable body but to reject said second substance of larger molecular size.

10. The apparatus according to claim 9, wherein said first liquid is a solution or suspension of salt in water, and said first semipermeable body has pores of relatively small size to pass, by natural osmosis, the water of said solution or suspension but to reject said salt, to thereby dilute said intermediate liquid.

11. The apparatus according to claim 10, wherein said first and second semipermeable bodies are semipermeable membranes.

12. The apparatus according to claim 10, wherein said intermediate liquid is a concentrated solution of cane sugar in water, and said second semipermeable body has pores of substantially larger size than those of said first semipermeable body to pass, by reverse osmosis, water in the diluted concentrated solution but to reject said cane sugar.

13. Apparatus for desalinating saline water, comprising:
a first semipermeable membrane;
means for feeding the saline water to one side of said first semipermeable membrane;
means for feeding to the other side of said first semipermeable membrane a concentrated solution of a high molecular weight substance dissolved in water, to thereby effect, through said first semipermeable membrane, natural osmosis of water from the saline water to the concentrated solution, diluting the concentrated solutions;
a second semipermeable body having larger pores than said first semipermeable body;
means for feeding the so-diluted concentrated solution to one side of the second semipermeable body;
and means for applying mechanical pressure to said diluted solution on said one side of the second semipermeable body to thereby effect reverse osmosis of water through said second permeable membrane but to reject said second substance of larger molecular size.

14. The apparatus according to claim 13, further including means for recirculating the solution from said one side of said second semipermeable body to said other side of the first semipermeable membrane;
and means for feeding fresh saline water to said one side of the first semipermeable body.

15. Apparatus according to claim 9, further including means for heating the intermediate liquid before it is subjected to natural osmosis via said first semipermeable body.

* * * * *